Feb. 26, 1935.  J. B. PILLATSCH  1,992,580
COUPLING
Original Filed May 31, 1932   2 Sheets-Sheet 1
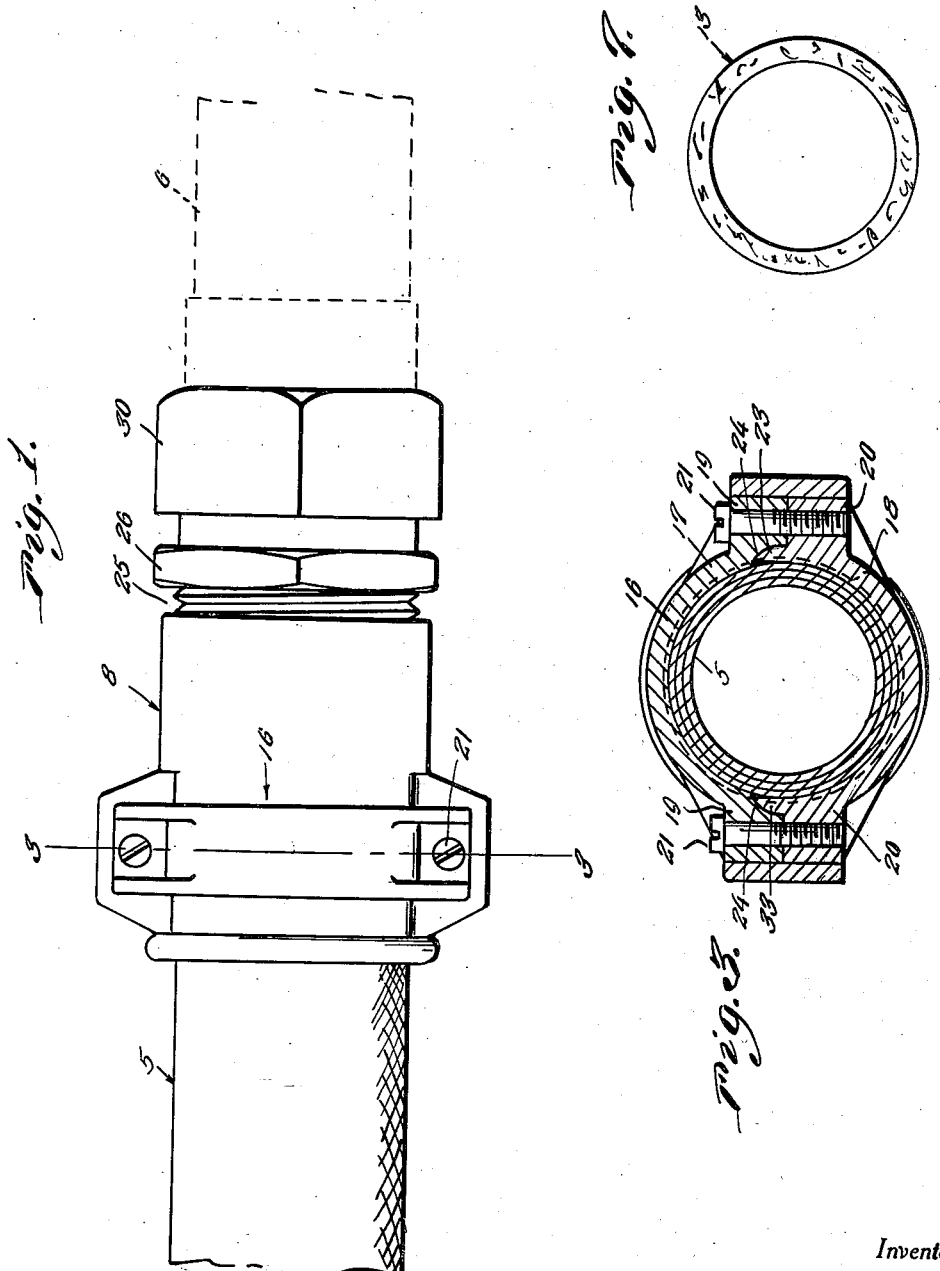
Inventor
J. B. Pillatsch
By Clarence A. O'Brien
Attorney Feb. 26, 1935.        J. B. PILLATSCH        1,992,580
COUPLING
Original Filed May 31, 1932    2 Sheets-Sheet 2
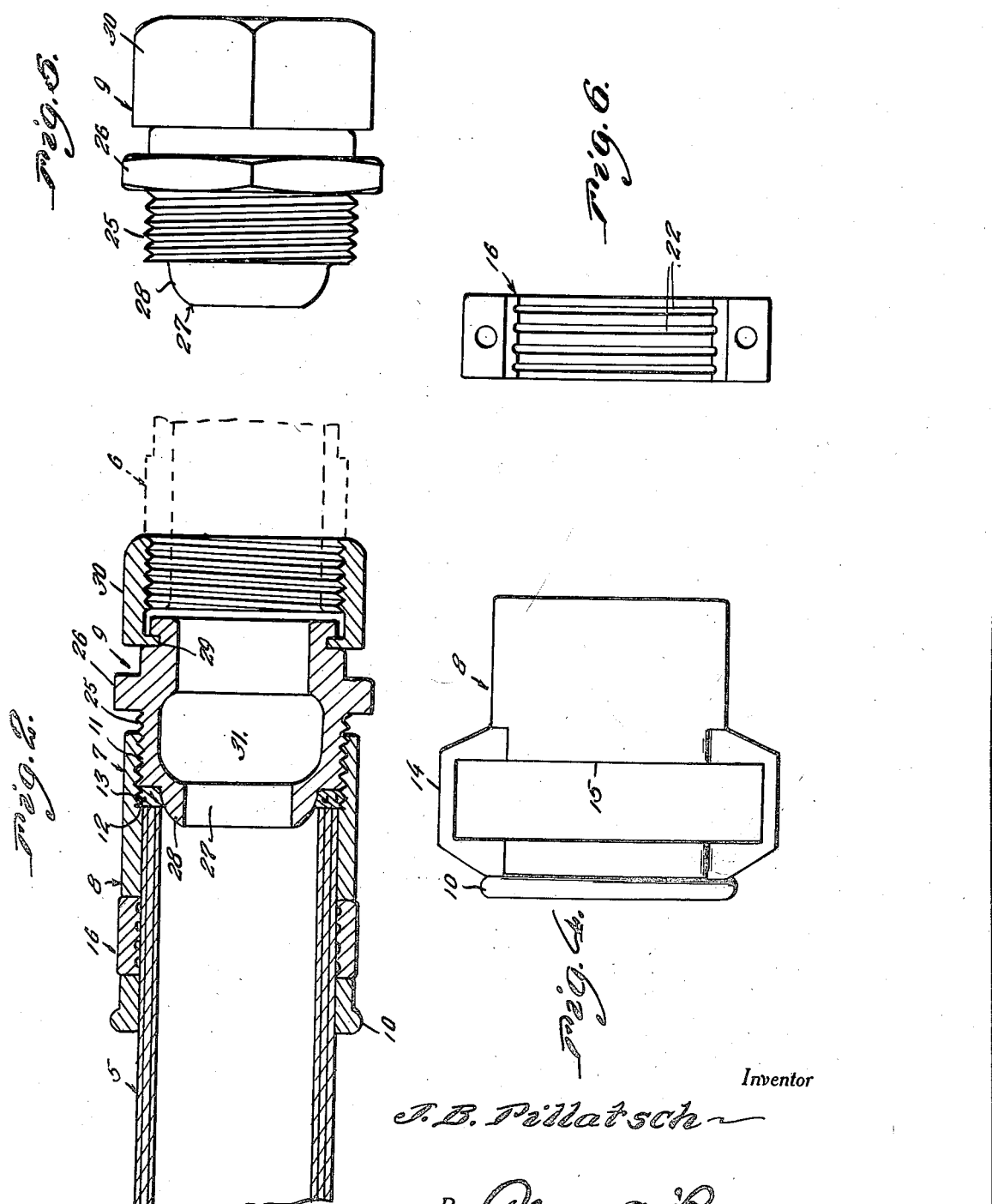
Inventor
J. B. Pillatsch
By Clarence A. O'Brien
Attorney Patented Feb. 26, 1935

1,992,580

UNITED STATES PATENT OFFICE 1,992,580

COUPLING

John B. Pillatsch, Aurora, Ill.

Application May 31, 1932, Serial No. 614,532
Renewed August 4, 1934

9 Claims. (Cl. 285—84)

My invention relates to improvements in couplings, and particularly to couplings for flexible hose.

An important object of my invention is to provide means capable of being applied in the field whereby flexible hose couplings may be reset quickly and easily and shipping of the lengths of hose to the manufacturer for resetting of the couplings is avoided. At the present time this is considered necessary, because of the difficulties entailed in installing and resetting present constructions of coupling members which are in many instances so great as to prompt the throwing away of lengths of hose from which the couplings have become detached or partially severed rather than attempt to repair the same.

It is also an important object of my invention to provide a coupling capable of being readily and easily installed by hand and reset upon flexible hose by unskilled persons in the field and which is especially constructed to avoid pinching or collapsing the hosing, but which nevertheless tenaciously grips the hose so as to connect the same in a manner as efficient as though the same had been installed or reset by machinery.

Other objects and advantages of my invention will be apparent from a reading of the following description of the drawings, wherein for purposes of illustration I have shown a preferred embodiment of the invention.

In the drawings:—

Figure 1 is a side elevational view of the embodiment of the invention showing it installed upon one end of a flexible hose.

Figure 2 is a longitudinal vertical sectional view through Figure 1.

Figure 3 is a transverse vertical sectional view through Figure 1, taken approximately on the line 3—3.

Figure 4 is an elevational view of one of the coupling members.

Figure 5 is an elevational view of the other coupling member.

Figure 6 is an elevational view of the inside one of the clamping or gripping members associated with the coupling members shown in Figure 4.

Figure 7 is a vertical sectional view of the gasket member.

Referring in detail to the drawings, wherein like numerals refer to like parts throughout the same, the numeral 5 generally designates an end portion of a flexible metal hose or similar flexible self-supporting hose, while the numeral 6 refers generally to a connection to a machine to be supplied by the hose, between which and the hose is placed the coupling generally designated 7 which constitutes the embodiment of my invention. Through continual flexing, the flexible hosing or tubes soon become impaired and break at the coupling to the machine with which the hose supplies, so that it becomes necessary to cut off the damaged portion and reset the coupling on the end of the hose, an operation which is attended with considerable delay and expense as already indicated herein. Instead of sending the damaged hose lengths to the factory for the resetting of the couplings thereon, I have provided the readily installable coupling generally designated 7 which is composed of the female member 8 and the male member 9.

The female member 8, usually referred to as the ferrule, consists of a tubular formation having a lip or bead 10 at the hose receiving end thereof and provided at the other end with the interior screw-threaded portion 11 whose inward end defines a shoulder 12. The hose 5 is adapted to be passed into the ferrule up to the shoulder 12 where it is met by a packing ring 13 maintained in fluid sealing relation between the ferrule and the end of the hose by the male member or coupling body 9 in a manner to be described. In the event that the ferrule 8 is desired to be exteriorly instead of interiorly threaded, the hose end 5 may be passed beyond the point illustrated in Figure 2 so as to be engaged by the provided portion of the coupling body for establishing the necessary fluid seal.

Near the receiving end of the ferrule, the ferrule is provided with laterally extended portions 14 which bound a transverse opening 15 formed through the ferrule for accommodating the sectional clamping ring section generally designated 16 in Figures 1 and 3.

The sectional clamping ring 16 comprises the semi-annular section 17 and semi-annular section 18. Each end of each section is provided with squared or other suitably formed ears 19, 19, and 20, 20 which have registrable bores. The bores in the ears 19, 19 are smooth, while the bores in the ears 20, 20 are threaded. This arrangement is made to accommodate the clamping screws 21 which are passed through the ears of the section 17 and threaded into the section 18 for contracting the sections together. The opening 15 may be of any suitable formation, the sectional clamping ring being conformably constructed. The sections are adapted to engage opposite sides of the hose 5 and to be clamped thereto by means of the screws 21, the sections being confined on the ferrule by their position in the opening 15.

The interior diameter of the sectional ring is slightly less than that of the exterior diameter of the hose to be clamped in the ferrule, and the interior surfaces of the sections may be provided with corrugations 22 adapted to conform with the corrugations or other formations of the exterior of the hose so as to enable a strong and effective grip upon the hose without unduly compressing the hose.

As seen in Figure 3 the section 18 has extending circumferentially beyond its ears, lugs 23 provided with curved outer faces, which lugs 23 are adapted to be seated in cut out portions 24 formed in the interior of the section 17 near the ears 19 thereof. This arrangement is provided so that as the rings are placed about the hose and in the opening in the ferrule, none of the hose will be permitted to extrude between the sections and become pinched as the sections close relative to each other toward the final clamping position. By the use of the arrangement just described the interior surface of the sectional ring is practically continuous, and an equal even pressure is exerted upon all sides of the hose simultaneously as the clamping action progresses under the action of the screws 21. It will be observed that by this means the hose end is efficiently connected in the ferrule without having been subjected to pinching or collapsing, and sufficient of the hose is extended into the ferrule for proper relationship of these parts.

The male member or coupling body 9 may comprise a conventional cylindrical form having the exteriorly threaded portion 25 screw-threadedly engageable with the interior threaded portion 11 of the ferrule, together with a lateral annular flange 26 adapted for accommodating a wrench. At the inward terminal of the screw-threaded portion 25 there is arranged an annulus 27 which has its radially outward surface rounded as indicated at 28 for engaging the packing 13 with a wedging action and for engaging into the mouth of the hose without damaging the mouth of the hose. Extending outwardly of the wrench receiving annulus 26 the body is provided with the usual annular groove 29 with which is rotatably associated the conventional cap 30 adapted for connection with the machine or the like to be supplied by the hose. If desired, an enlarged chamber 31 may be provided in the male member extending from the annulus 28 to a point coincident with the location of the wrench receiving annulus 26.

Though I have shown and described herein a preferred embodiment of the invention, it is to be definitely understood that I do not desire to limit the application of the invention thereto, and any change or changes may be made in material and structure and arrangement of parts, consistent with the spirit of the invention and the scope of the subjoined claims.

What is claimed is:—

1. A coupling for flexible hose, said coupling comprising a ferrule for receiving a hose end therein and provided with openings in its sides, a clamping member carried by the ferrule and engageable with the hose end through the openings for clamping the hose end in the ferrule, and a nipple arranged on another hose end and receivable in the outward end of the ferrule so as to connect the hose ends, and a compressible ring within the outward end of the ferrule and engaged with the hose end therein, said compressible ring being arranged to engage the compressible ring and compress the same between itself and the first hose end.

2. A coupling for flexible hose, said coupling comprising a ferrule for receiving a hose end therein and provided with openings in its sides, a clamping member carried by the ferrule and engageable with the hose end through the openings for clamping the hose end in the ferrule, and a nipple arranged on another hose end and receivable in the outward end of the ferrule so as to connect the hose ends, and a compressible ring within the outward end of the ferrule and engaged with the hose end therein, said compressible ring being arranged to engage the compressible ring and compress the same between itself and the first hose end, said nipple having a portion of reduced diameter for entering the ring and compressing the same outwardly.

3. A coupling for a pair of flexible hose ends, said coupling comprising a ferrule receiving one hose end therein and provided with openings in its sides, a clamping member carried by the ferrule and having portions engageable with said hose and through the said openings for clamping the hose in the ferrule, a nipple mounted on the second hose end and threadable into the outer end of the ferrule to abut the first hose end, the nipple having a bevelled annular portion which enters the first hose end to compress the first hose end between itself and the interior of the ferrule.

4. A coupling for a pair of flexible hose ends, said coupling comprising a ferrule receiving one hose end therein and provided with openings in its sides, a clamping member carried by the ferrule and having portions engageable with said hose end through the said openings for clamping the hose in the ferrule, a nipple mounted on the second hose end and threadable into the outer end of the ferrule to abut the first hose end, the nipple having a bevelled annular portion which enters the first hose end to compress the first hose end between itself and the interior of the ferrule, and a compressible packing ring located between said bevelled portion, the remainder of the inner end of the nipple, and the first hose end.

5. A coupling for a pair of flexible hose ends, said coupling consisting of a ferrule receiving one of the hose ends and provided with a pair of opposed openings in its sides, a clamping member arranged to surround the hose end, said clamping member being located in said openings in the ferrule and having portions engaging the ends and sides of the said openings so as to be held in position on the said hose end and connect the hose end to the ferrule, and a nipple mounted on the second hose end and connectible within the outer end of the ferrule.

6. A coupling for a pair of flexible hose ends, said coupling consisting of a ferrule receiving one of the hose ends and provided with a pair of opposed openings in its sides, a clamping member arranged to surround the hose end, said clamping member being located in said openings in the ferrule and having portions engaging the ends and sides of the said openings so as to be held in position on the said hose end and connect the hose end to the ferrule, and a nipple mounted on the second hose end and connectible within the outer end of the ferrule, said nipple having an annular reduced portion at its inner end for entering the first hose end.

7. A coupling for a pair of flexible hose ends, said coupling consisting of a ferrule receiving one of the hose ends and provided with a pair of opposed openings in its sides, a clamping member arranged to surround the hose end, said clamping member being located in said openings in the ferrule and having portions engaging the ends and sides of the said openings so as to be held in position on the said hose end and connect the hose end to the ferrule, and a nipple mounted on the second hose end and connectible within the outer end of the ferrule, said nipple having an annular reduced portion at its inner end for entering the first hose end, said annular reduced portion being bevelled and defining a shoulder on the inner end of the nipple, and a compressible packing ring on the annular bevelled portion and arranged to be compressed by entry of the nipple into the ferrule so as to engage and be compressed by and between the first hose end, said shoulder, the interior of the ferrule and by said annular bevelled portion.

8. A coupling for a pair of flexible hose ends, said coupling consisting of a ferrule receiving one of the hose ends and provided with a pair of opposed openings in its sides, a clamping member arranged to surround the hose end, said clamping member being located in said openings in the ferrule and having portions engaging the ends and sides of the said openings so as to be held in position on the said hose end and connect the hose end to the ferrule, and a nipple mounted on the second hose end and connectible within the outer end of the ferrule, said clamping member comprising a pair of opposed sections.

9. A coupling for a pair of flexible hose ends, said coupling consisting of a ferrule receiving one of the hose ends and provided with a pair of opposed openings in its sides, a clamping member arranged to surround the hose end, said clamping member being located in said openings in the ferrule and having portions engaging the ends and sides of the said openings so as to be held in position on the said hose end and connect the hose end to the ferrule, and a nipple mounted on the second hose end and connectible within the outer end of the ferrule, said clamping member comprising a pair of opposed sections, portions of the opposed sections being slidably engaged during and subsequent to their operation into clamping engagement with the first hose end.

JOHN B. PILLATSCH.